July 28, 1953  C. H. BROWN  2,646,850
POWER STEERING AND CENTERING MEANS FOR TRAILER WHEELS
Original Filed June 25, 1948
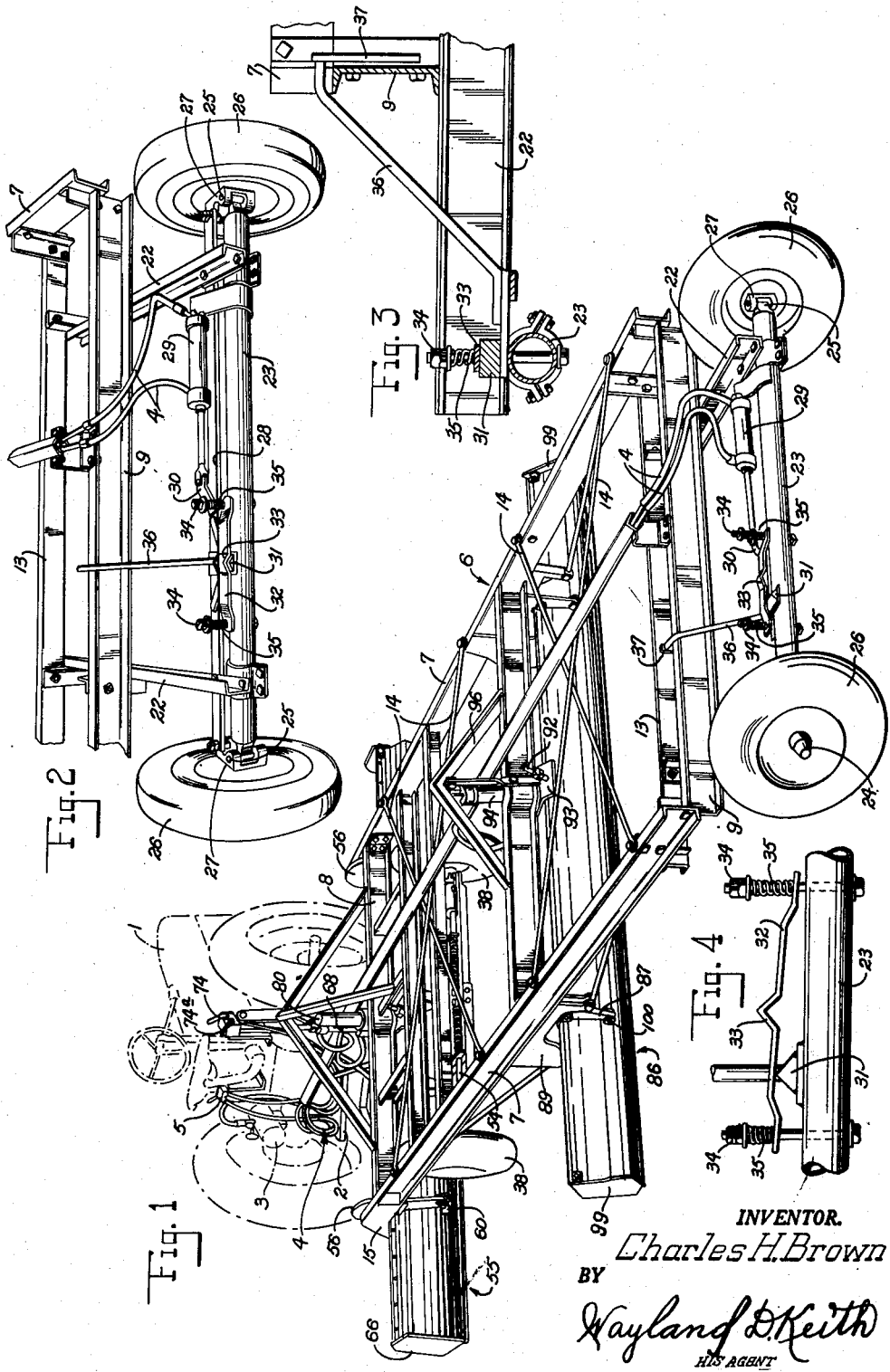
INVENTOR.
Charles H. Brown
BY
Wayland D. Keith
HIS AGENT Patented July 28, 1953

2,646,850

UNITED STATES PATENT OFFICE 2,646,850

POWER STEERING AND CENTERING MEANS FOR TRAILER WHEELS

Charles H. Brown, Breckenridge, Tex.

Original application June 25, 1948, Serial No. 35,123. Divided and this application February 7, 1950, Serial No. 142,865

2 Claims. (Cl. 180—79.2)

This invention relates to improvements in land vehicles.

This application is a division of my application for land surfacing implements, filed June 25, 1948, Serial No. 35,123, now abandoned.

The object of this invention is to improve the control of the wheels from a remote point, as by fluid power means.

This object may be accomplished by providing guide wheels, such as the rear wheels, that may be controlled as to direction through fluid power means without requiring a mechanical connection with the steering wheels.

This is especially applicable to vehicles that travel over land, and may be applied, if desired, to land surfacing implements. Provision may be made for short turn of the vehicle or implement by steering the rear wheels, if desired.

An embodiment of this invention is illustrated in the accompanying drawings in which:

Fig. 1 is a perspective view of the land surfacing implement showing it attached to a tractor, the tractor being shown in dot-dash outline, and the implement being shown in turning position;

Fig. 2 is a fragmentary perspective rear view of the implement with the wheels positioned for straight line travel;

Fig. 3 is a fragmentary longitudinal sectional view through the rear portion; and Fig. 4 is a fragmentary rear view of a locking device for the steering mechanism.

With more detailed reference to the drawings, the numeral 1 designates a tractor which has the usual draw bar 2, and hydraulic pump 3, as frequently mounted on such tractors. The pump 3 is adapted to be operated by the power plant of the tractor and to supply liquid under pressure from a suitable source on the tractor to conduits, generally designated at 4, in Fig. 1, under control of a hand manipulated valve 5, mounted within convenient reach of the operator on the tractor.

The numeral 6 designates generally the land surfacing implement as a unit, which is adapted to be drawn behind the tractor, either for transportation or for surfacing operation. This implement in the form illustrated comprises opposite side frame members 7, connected together at their opposite ends by front and back end frame members 8 and 9, respectively, as shown particularly in Fig. 1, and braced intermediate their ends by cross frame members 10, 11, 12 and 13. These parts are rigidly secured together in any suitable manner as by welding, riveting, bolting, or the like, and form a sturdy and rigid frame structure for the implement. This frame structure of the implement is ordinarily of appreciable length, exceeding in many instances twenty-five feet in length. In order to provide a rigid strong frame structure, diagonal brace members may be used, if desired, as indicated at 14, arranged in cross relation, in the form of tie rods, and extending between the opposite side frame members 7. These tie rods lend additional rigidity to the frame structure and supplement the bracing action of the transverse frame members.

At their forward ends, the opposite side frame members 7 have downturned tongue portions, generally indicated at 15. The forward end of each tongue portion 15 is adapted to be connected to the draw bar 2 with which it may be connected by a suitable pin or bolt.

At the rearward end of the frame of the implement, as shown in Fig. 1, are extension frame members 22 that pass under the transverse member frames 9 and 13, lengthwise of the implement and are rigidly secured to these transverse frame members in any suitable manner as described above. These extension members 22 have rigidly secured thereto the transverse rear axle generally designated at 23, and on which stub axles 24 are pivotally mounted at 25. The rear wheels are designated at 26 and are journaled on the stub axles 24. This manner of mounting the rear wheels 26 enables them to be used as guiding wheels for a steering action.

The longer the wheel base of the implement, the more accurately is the work performed. However, the length of the land surfacing implement presents a problem in steering, as it is often necessary to turn the implement in a short radius when it is drawn behind a traction element, such as a tractor. In order to accomplish this steering operation and to facilitate the steering of the implement, the rear wheels 26 are so mounted as to be capable of steering action, turning about the pivots 25 accordingly.

Each of the stub axles 24 has offset arms 27 fixed thereto, as shown in Fig. 2, which arms 27 are connected together by a tie rod 28 that is pivoted to the respective arms so as to keep the wheels 26 in correct parallel alignment while the implement is traveling in straight line direction, as well as to swing the wheels for steering action when desired. This steering action is accomplished by a double acting hydraulic power device, generally designated at 29, which is of the usual character, including a cylinder having a piston operatively mounted therein, and connected with a pair of hoses or flexible tubes, generally designated at 4, that lead from the valve 5 of the hydraulic pump 3. The valve 5 will control the application of hydraulic pressure into one end or the other of the hydraulic power device. The piston of this device 29 is pivotally connected with a bracket 30 attached to the tie rod 28, so that upon movement of the piston in either direction a corresponding movement will be imparted to the tie rod 28 to swing the wheels in the corresponding direction.

Also connected with the tie rod 28 and extending upwardly and rearwardly therefrom, as shown in Figs. 2 and 4, is a catch member 31 which has an upper surface, preferably of inverted V-shape, to facilitate the holding action of this member. The catch member 31 is mounted slidably upon the upper surface of the rear axle 23, to shift lengthwise thereof, beneath a clamping bar 32 that has a keeper portion 33, of complementary shape to the catch member 31. The bar 32 is mounted loosely over the rear axle 23 upon bolts 34 carried by the rear axle and is yieldably held in downward position by coiled springs 35 sleeved on the bolts 34. Normally, the catch member 31 is seated within the keeper portion 33 and is retained therein by the yieldable action of the springs 35 when the wheels are in parallel relation with respect to the longitudinal center axis of the frame, so that upon forward movement of the machine the rear wheels will travel substantially in straight parallel relation.

The springs 35 will exert sufficient pressure on the bar 32, normally to prevent displacement of the catch member 31 from the keeper portion 33. However, the angularity of the interfitting relation between these parts is such that upon exerting hydraulic pressure on the piston in the power device 29, the plunger thereof will be moved in one direction. This movement will be transmitted to the tie rod 28, which is secured to the catch member 31, and will force the catch member from the keeper portion 33 in a corresponding direction as indicated, for instance, in Figs. 1 and 4, the center position being shown in Fig. 2. This catch member 31 thus normally tends to prevent accidental displacement of the wheels 26 from their straight line parallel relation.

Also connected with the catch member 31 is an arm 36 that extends upwardly and forwardly from the tie rod 28, as shown in Figs. 1 and 3, to a position overlapping the cross frame member 9. The upper end of the arm 36 carries an indicating pointer 37, in position for cooperative registering action with indicia on the forward face of the cross frame member 9. This indicia is so disposed with respect to the pointer 37 to indicate to the operator the degree of turn of the wheels 26. Thus he can determine the extent of control of the valve 5 for regulating the hydraulic power device 29.

The front wheels are designated at 38.

A front scraper blade or moldboard is designated generally at 55, extending transversely of the frame of the implement beneath the latter. This moldboard member is supported by a pair of arms or hook-shaped members 56, which members are pivotally connected with the downturned end portions 15 of the frame structure. The pivotal supporting of the members 56 enables them to be positioned normally in their lower positions with the moldboard member 55 resting directly on the ground or to be raised to its upper position by the hydraulic power device 68.

The moldboard member 55 is embraced by the hook-portions of the arms 56, and is supported thereon by lugs 60 attached rigidly to the back face of the moldboard member 55 and secured by bolts to the arms 56. Hydraulic fluid under pressure is applied to the power device 68 through a pair of tubes or conduits 4, leading from the hydraulic pump 3. A control valve is shown at 74 in Fig. 1 to control the action of the power device 68, either for raising or lowering the blade 55.

A second moldboard or scraper blade is shown at 86, mounted intermediate the front and back wheels 38 and 26, preferably halfway therebetween. This blade 86 is secured to a pair of hook members 87 that are pivotally connected with the respective side frame members 7, by means of brackets 89 suspended from the latter.

The downward movement of the blade 86 is limited by means attached at one end to the blade 86, and at its opposite end to an eye-bolt 92 adjustably connected with a bracket 93 suspended from the cross frame member 12.

The blade 86 is adapted to be raised by a hydraulic power device of the double acting type indicated generally at 94. This power device is of the character having a cylinder with a piston operatively mounted therein and connected at its opposite ends through tubing 4 with the fluid pressure pump 3. The power devices 94 and 68, described above, are individually controlled by the valves 74 and 74a (Fig. 1) to selectively raise or lower the blades. The cylinder of the power device 94 is pivotally supported on an upstanding bracket 96 carried by the frame of the implement.

The moldboard or scraper blade 86 is provided with wings 99 at opposite ends thereof, to confine the dirt and prevent it from being discharged at the ends of the blade. This blade may be formed similar to the blade 55, if desired. It is supported at 100 on the hook members 87 by attachments capable of being readily removed therefrom, when desired, for transportation or otherwise. This blade 86 may also be of substantial length, 12 feet or more in length, and therefore removable to place it lengthwise on the frame of the implement for transportation when not in use.

*Operation*

This land surfacing implement is designed to surface the top soil so as to put the soil in condition for planting rice or other seeds that require a substantially level seed bed. The implement is designed to take the top from mounds of dirt, which may be several feet in extent in both directions, and to carry this dirt to the low places in the seed bed where it is deposited in such manner that the entire surface of the seed bed presents substantially a level surface, and by the utilization of the scraper 55 ahead of the front wheels 38, these wheels are provided with an initially surfaced plane over which to pass.

Therefore, with the wheels passing over an initially leveled surface, the machine as a whole operates on a much more even keel than would be accorded with the wheels passing over humps and into depressions. The blade 86 preferably is positioned midway between the front wheels 18 and the rear wheels 14, and with these rear wheels traveling in the path leveled by the blade 86 and with the blade 86 gauged to remove the remaining irregularities left by the blade 55, and to deposit the soil accumulated from the high places into the low places, it will be appreciated that the blade 86 will remove approximately one-half the irregularities that remain and deposit this soil in the low places, which results in a substantially smooth surface for the seed bed, which may be irrigated evenly. This operation is accomplished by one passage of the machine over the field. The alignment of the cutter on the front moldboard is a line from the twice-shaved surface being traveled by the rear wheels through the once-shaved plane being traveled by the front wheels, which enables the leveling of the surface with respect to the twice-shaped surface.

With leveling devices operating and with the wheels traveling outside the swath being operated upon, or in front of the moldboard, it will be seen that a sort of "corduroy effect" is produced, and these ridges must be gone over repeatedly to make the surface approximately as smooth as the present machine makes it at one passage thereover.

In leveling land, trash such as rice straw, weeds and the like, often collects in front of the moldboards, and must be dumped while the machine is in motion by raising the moldboard 55, and it is desirable to do this as quickly as possible. Therefore, the front moldboard, which is heavily constructed in order to handle the irregularities in the ground and in distributing the load, is provided with a counterbalancing spring, preferably sustaining the moldmoard a short distance above the ground. The moldboard blade 55 is held down by pressure from the double acting hydraulic power device 68, so as to maintain a uniform, gauged depth of cut. When trash accumulates, the pressure is reversed from the top of the piston in the cylinder 68 to the bottom thereof for raising the moldboard, dumping the trash, and re-engaging the ground, the whole process occupying a period of about four seconds.

In order to accommodate a short turning radius, the tractor may be turned in one direction, and by manipulation of the control valve 5, the hydraulic steering mechanism is adapted to cant the wheels on the implement in the opposite direction, as shown in Fig. 1, which makes possible a very short turning radius.

The steering mechanism described above may be applicable to vehicles or implements generally, for steering action thereof, being useful either for the front or rear wheels thereof, although it is especially desirable for use for short-turn devices for steering the rear wheels.

The reference to "fluid power device" in the claims contemplates and includes not only a hydraulic power device but also one that operates on other fluid pressures, as compressed air, vacuum, etc.

While the invention has been illustrated and described in one embodiment, it is recognized that variations and changes may be made therein without departing from the invention, except as specified in the claims.

I claim:

1. A land implement comprising a frame having spaced parallel side members interconnected adjacent their respective ends by front and rear cross members, front and rear axles connected to said side members adjacent the front and rear ends thereof, a stub axle pivotally mounted on each end of said rear axle for movement about an upright axis, a wheel mounted on each of said stub axles and a wheel mounted on each end of said front axle, a tie rod having its ends connected with said stub axles, a bracket mounted on said rear axle adjacent one of said side members, a hydraulically operated piston spported on said bracket, a piston rod having one of its ends secured to said piston and the other end thereof connected with said tie rod whereby actuation of said piston in either direction will cause a turning movement of said wheels mounted on said stub axle simultaneously and in the same degree about the vertical axis, and means for maintaining said wheels mounted on said stub axles in a predetermined position, said means comprising an elongated keeper bar mounted on said rear axle intermediate its ends, said keeper bar having a notch formed therein open at its under side, a latch bar slidably mounted on and extending transversely of said rear axle for reciprocating movement in the direction of its longitudinal axis, said latch bar being normally positioned within said recess, means interconnecting said latch bar with said piston rod for movement to either side of said notch, and resilient means for releasably maintaining said latch bar within said recess.

2. A land implement comprising a frame, an axle mounted on said frame, means for mounting a wheel at each end of said axle, means connecting said wheels to effect simultaneous turning movement thereof and in the same degree, power means connected with said last-named means to effect said turning movement of said wheels, and means for maintaining said wheels in a predetermined position, said means comprising an elongated keeper bar mounted on said axle intermediate its ends, said keeper bar having a notch formed therein open at its under side, a latch bar slidably mounted on and extending transversely of said axle for reciprocating movement in the direction of the longitudinal axis of said axle, said latch bar being normally positioned within said recess, means interconnecting said latch bar with said power means for movement to either side of said notch, and resilient means for releasably maintaining said latch bar within said recess.

CHARLES H. BROWN.

References Cited in the file of this patent

UNITED STATES PATENTS

| Number | Name | Date |
|---|---|---|
| 518,268 | McKnight | Apr. 17, 1894 |
| 867,282 | Macfarren | Oct. 1, 1907 |
| 1,167,726 | Shepherd | Jan. 11, 1916 |
| 1,169,402 | Holt | Jan. 25, 1916 |
| 1,589,783 | Arndt | June 22, 1926 |
| 1,625,224 | Seawell | Apr. 19, 1927 |
| 1,698,980 | Wilson | Jan. 15, 1929 |
| 1,775,176 | Stokes | Sept. 9, 1930 |
| 1,777,109 | Stokes et al. | Sept. 30, 1930 |
| 2,070,832 | Johnson | Feb. 16, 1937 |
| 2,110,213 | Flowers | Mar. 8, 1938 |
| 2,131,760 | Schaefer | Oct. 4, 1938 |
| 2,152,511 | Vanderwerf | Mar. 28, 1939 |
| 2,163,892 | Sanford et al. | June 27, 1939 |
| 2,167,943 | Fox | Aug. 1, 1939 |
| 2,173,419 | Johnson | Sept. 19, 1939 |
| 2,330,557 | Collis | Sept. 28, 1943 |

FOREIGN PATENTS

| Number | Country | Date |
|---|---|---|
| 705,758 | Germany | May 8, 1941 |